Figure 1:
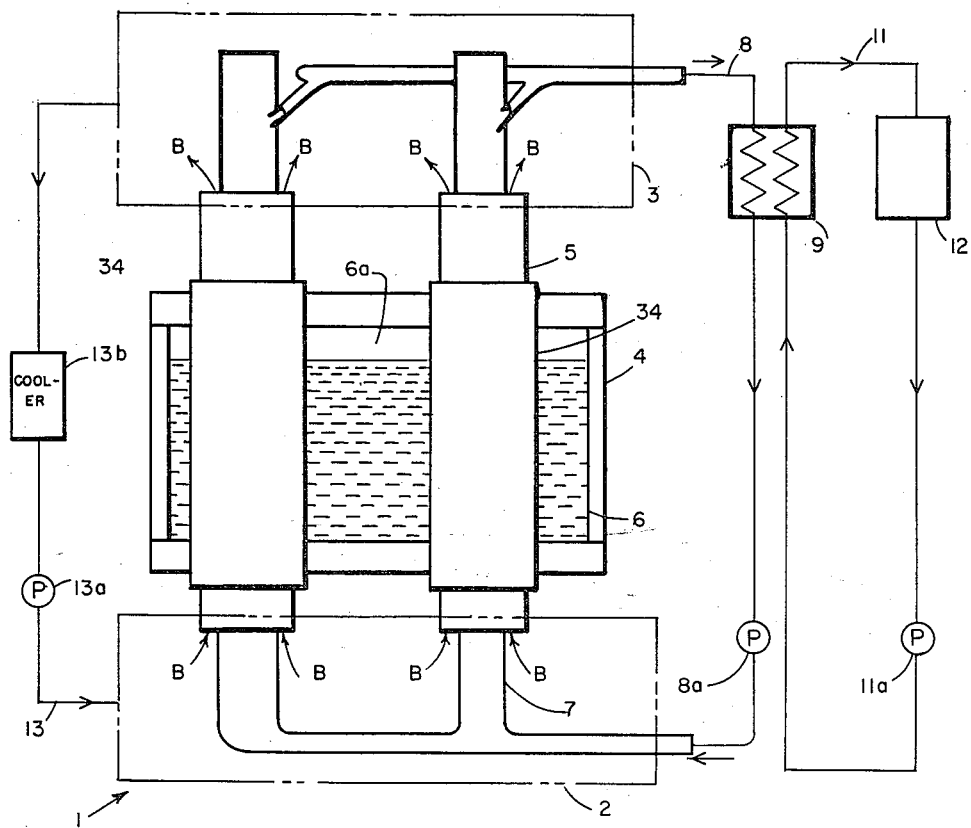

INVENTORS
EDGAR D. OPPENHEIMER
ROBERT A. WEISBERG

Feb. 26, 1963  E. D. OPPENHEIMER ETAL  3,079,321
SODIUM DEUTERIUM REACTOR
Filed Oct. 15, 1959  8 Sheets-Sheet 2

INVENTORS
EDGAR D. OPPENHEIMER
BY ROBERT A. WEISBERG

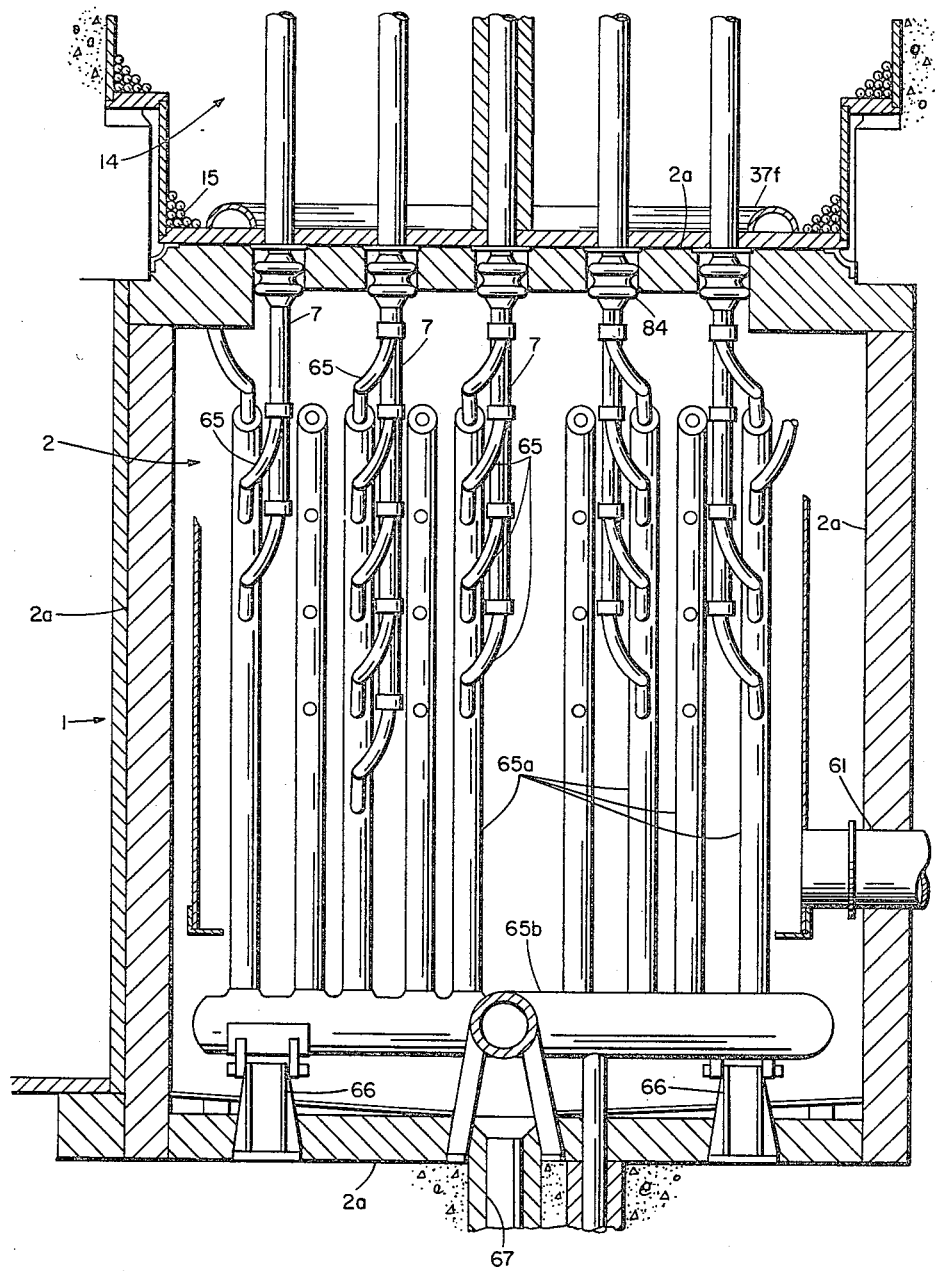

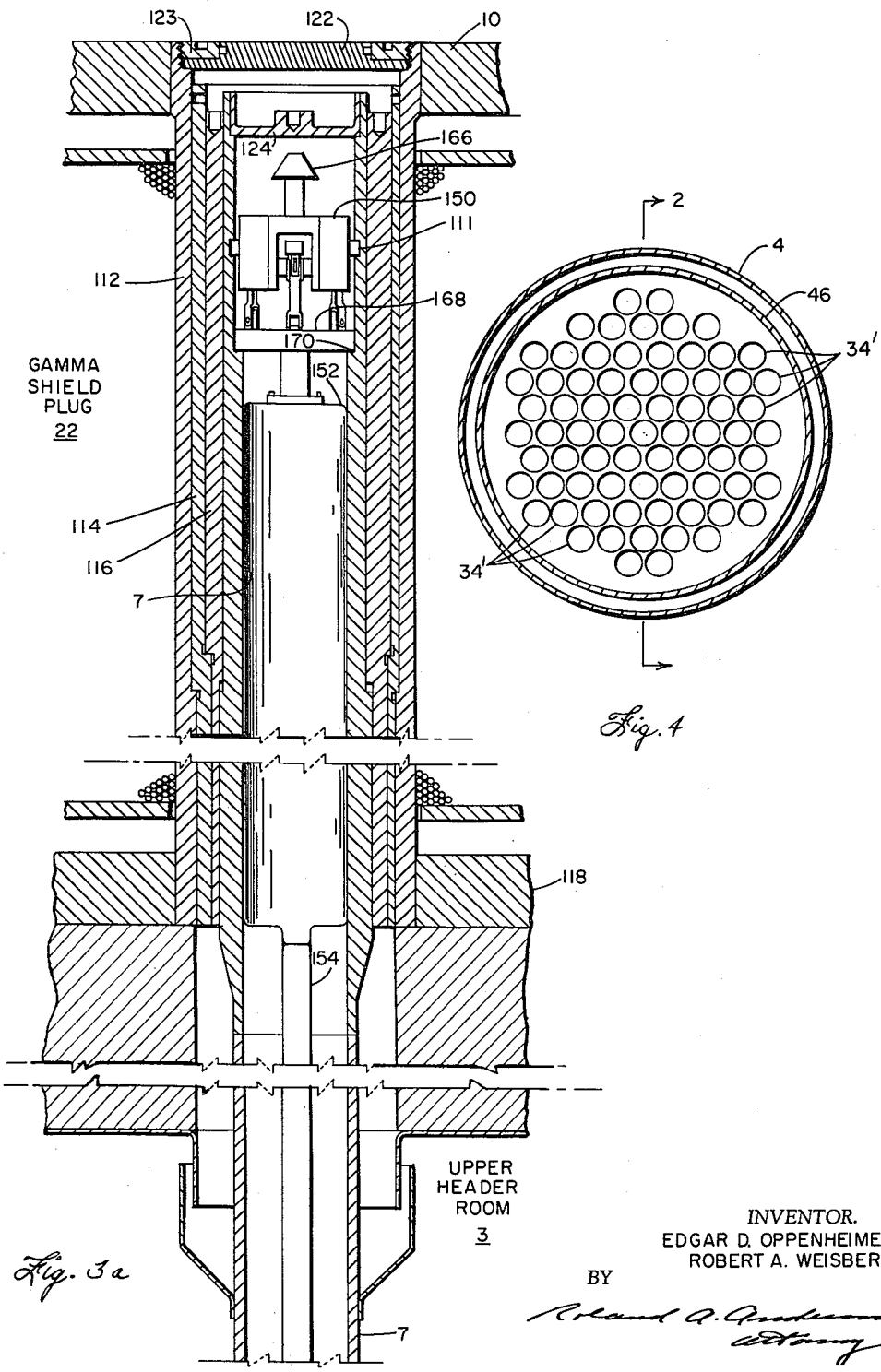

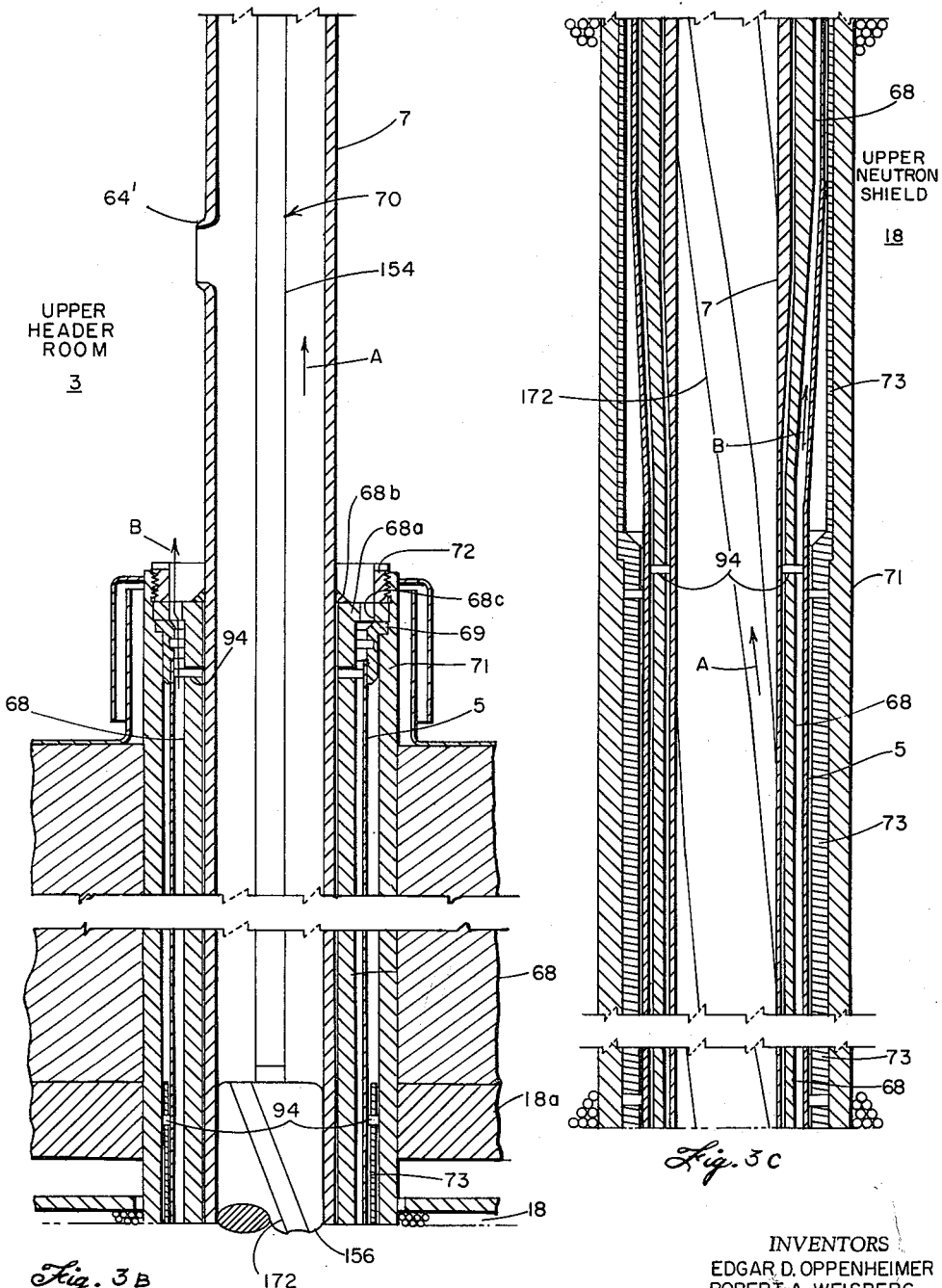

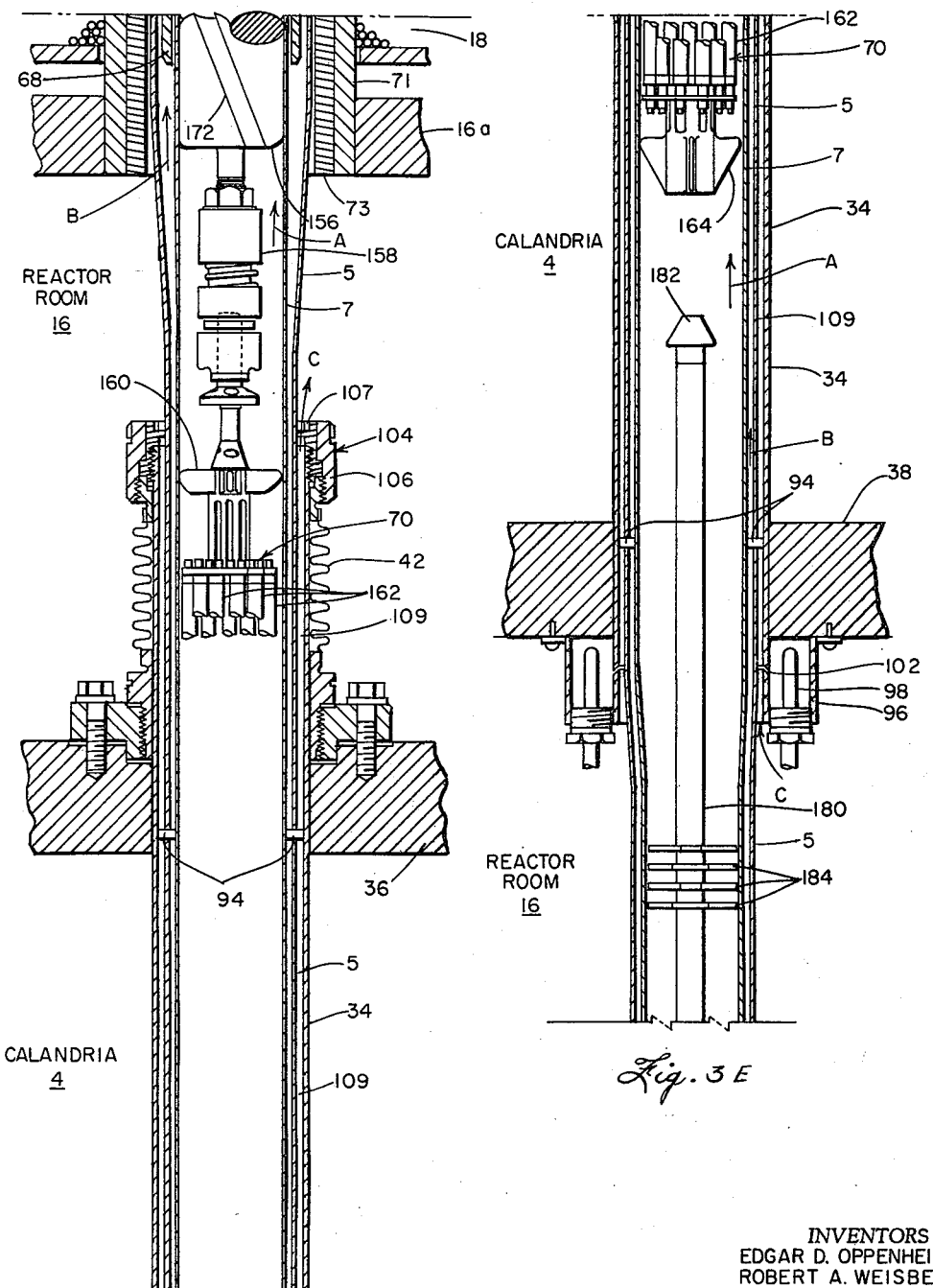

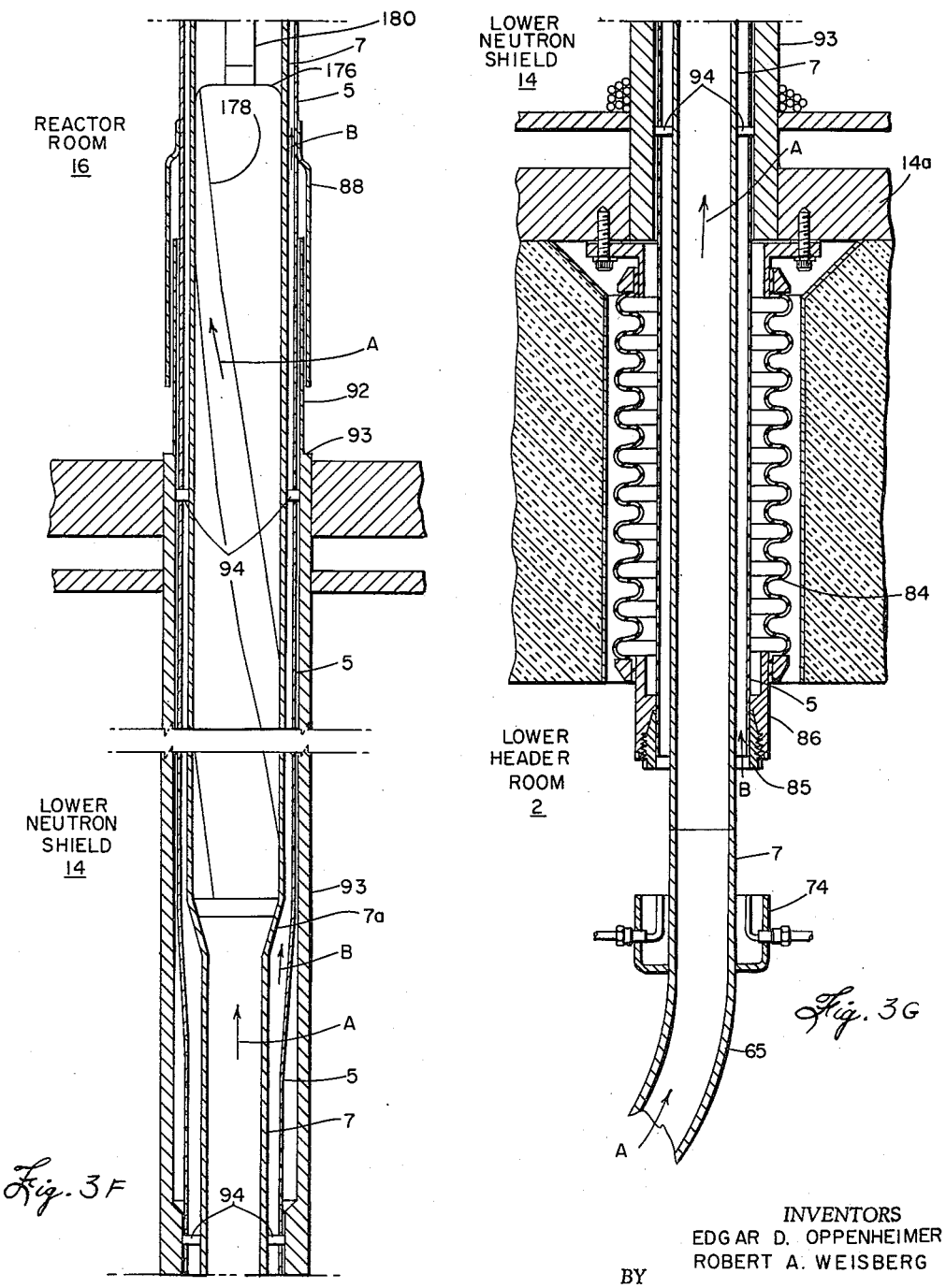

United States Patent Office 3,079,321
Patented Feb. 26, 1963

3,079,321
SODIUM DEUTERIUM REACTOR
Edgar D. Oppenheimer, Mamaroneck, and Robert A. Weisberg, Yonkers, N.Y., assignors to the United States of America as represented by the United States Atomic Energy Commission
Filed Oct. 15, 1959, Ser. No. 846,757
2 Claims. (Cl. 204—193.2)

The present invention relates to a leakage separation and barrier system for a sodium deuterium reactor, and more particularly to a barrier system for a sodium deuterium reactor for separating the sodium and deuterium oxide and limiting heat transfer between the sodium and deuterium oxide.

In a sodium deuterium reactor (SDR) of the type described in U.S. application Serial No. 647,137, filed March 19, 1957, in the name of G. Young, and more particularly described herein, a calandria arrangement is used to contain separately the high temperature sodium coolant and the low temperature $D_2O$ moderator. Fuel elements containing slightly enriched uranium are located in vertical tubes through which the high temperature sodium coolant flows. Relatively cold $D_2O$ moderator and reflector is contained in the calandria which surrounds the fuel-containing tubes which are located, in this instance, in a triangular lattice array. Control of the reactor is effected by poison rods which may occupy one or more regular lattice positions. The fuel elements are cooled by the molten sodium which flows within the tubes and surrounds the fuel elements, moving upwardly to leave the reactor and exchange its heat ultimately in the generation of steam, for example. In the annular spaces between the fuel-containing tubes and the surrounding calandria tubes are placed metal barrier tubes to insure that no contact between the sodium and the $D_2O$ can occur in the event of leakage of either or both the coolant or moderator system. In addition, the annular spaces between the fuel-coolant tubes and barrier tubes and between the barrier tubes and calandria tubes contain inert gas at essentially atmospheric pressure and tend to act as thermal insulation limiting the flow of heat from the hot sodium to the cool $D_2O$.

The sodium coolant is pumped into the lower end of each fuel-containing tube by way of a flow distribution system of headers and pigtails located in a lower header room. A coolant exit header system in an upper header room similar to the inlet header system in the lower header room is used to return the sodium from the fuel containing tubes to an external primary coolant system. Both the upper and lower header system configurations are designed to accommodate the differential thermal expansions of the various tubes as will be later seen. Neutron activation of the piping in the header rooms is sufficiently attenuated by neutron shields located above and below the calandria room to make the header rooms accessible for maintenance work within one to two weeks after reactor shutdown. Each of the fuel-containing tubes is supported from the top neutron shield and passes through a calandria tube; a dry nitrogen-filled annular clearance space separates these tubes. This invention concerns the arrangement for accomplishing the thermal and physical separation between the sodium and $D_2O$, and utilizes an aluminum barrier tube concentrically located in the aforementioned annular space. A baffle and drain arrangement is provided at the bottom of each barrier tube to collect separately sodium and $D_2O$ leakage in the event of a leak in either or both systems.

It is thus a first object of this invention to provide a barrier system for separating the primary coolant and moderator in a sodium deuterium reactor (SDR).

It is a further object of this invention to provide thermal insulation in an SDR for separating the primary cooling and moderator fluids in the reactor.

It is similarly a further object of this invention to provide a suitable annular gas flow passage within each calandria tube to permit circulation of gas therethrough.

It is still a further object of this invention to provide a barrier system and thermal insulation system between the coolant sodium and moderator $D_2O$ of an SDR which is so arranged as not to permit neutron and gamma radiation streaming at those places where the fuel containing tubes penetrate the reactor shielding.

It is a further object of this invention to maintain a suitable annular gas flow passage around the fuel containing tubes of a sodium deuterium reactor to permit circulation of gas therethrough.

Figure 2A:
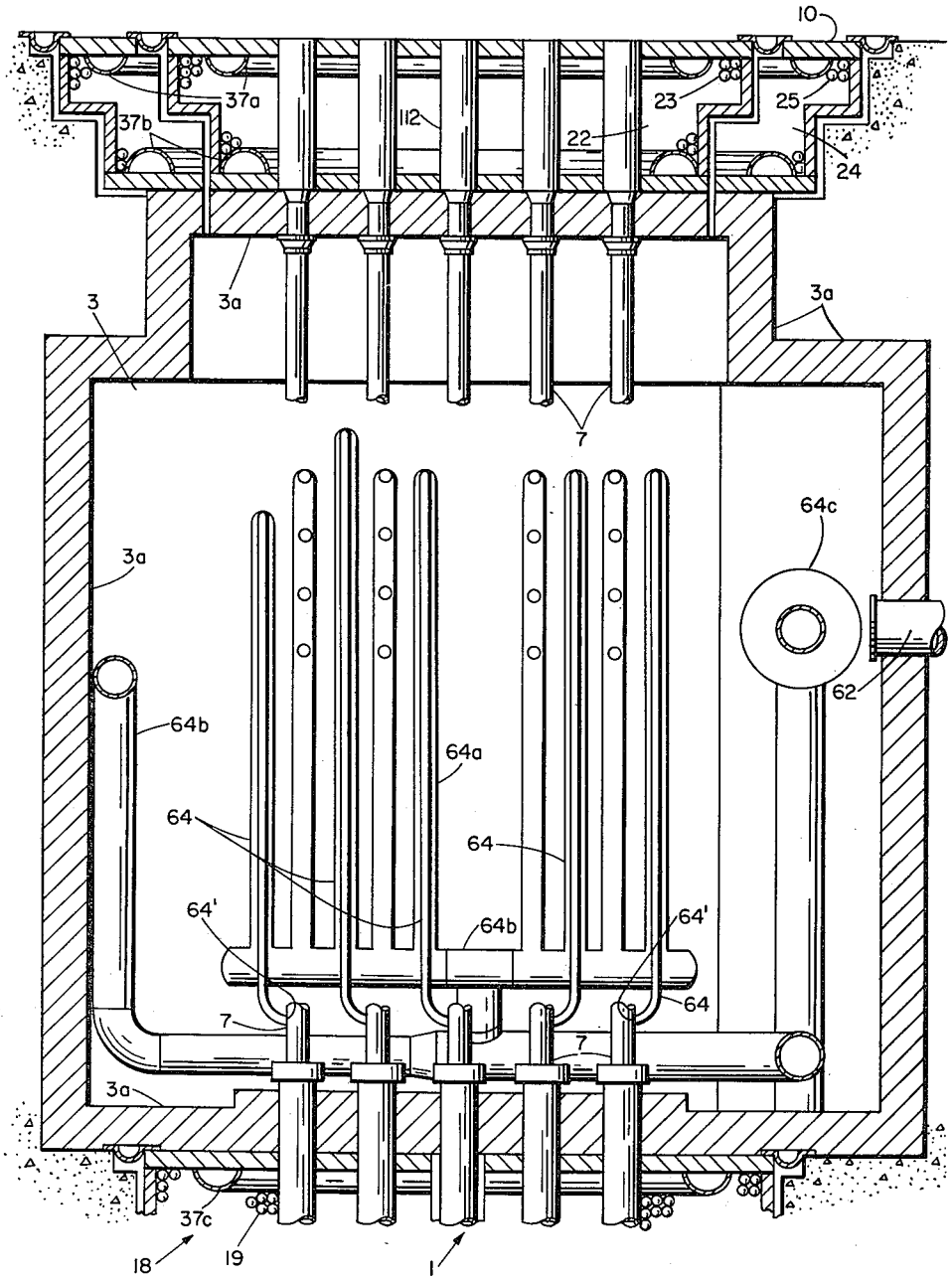
Figure 2B:
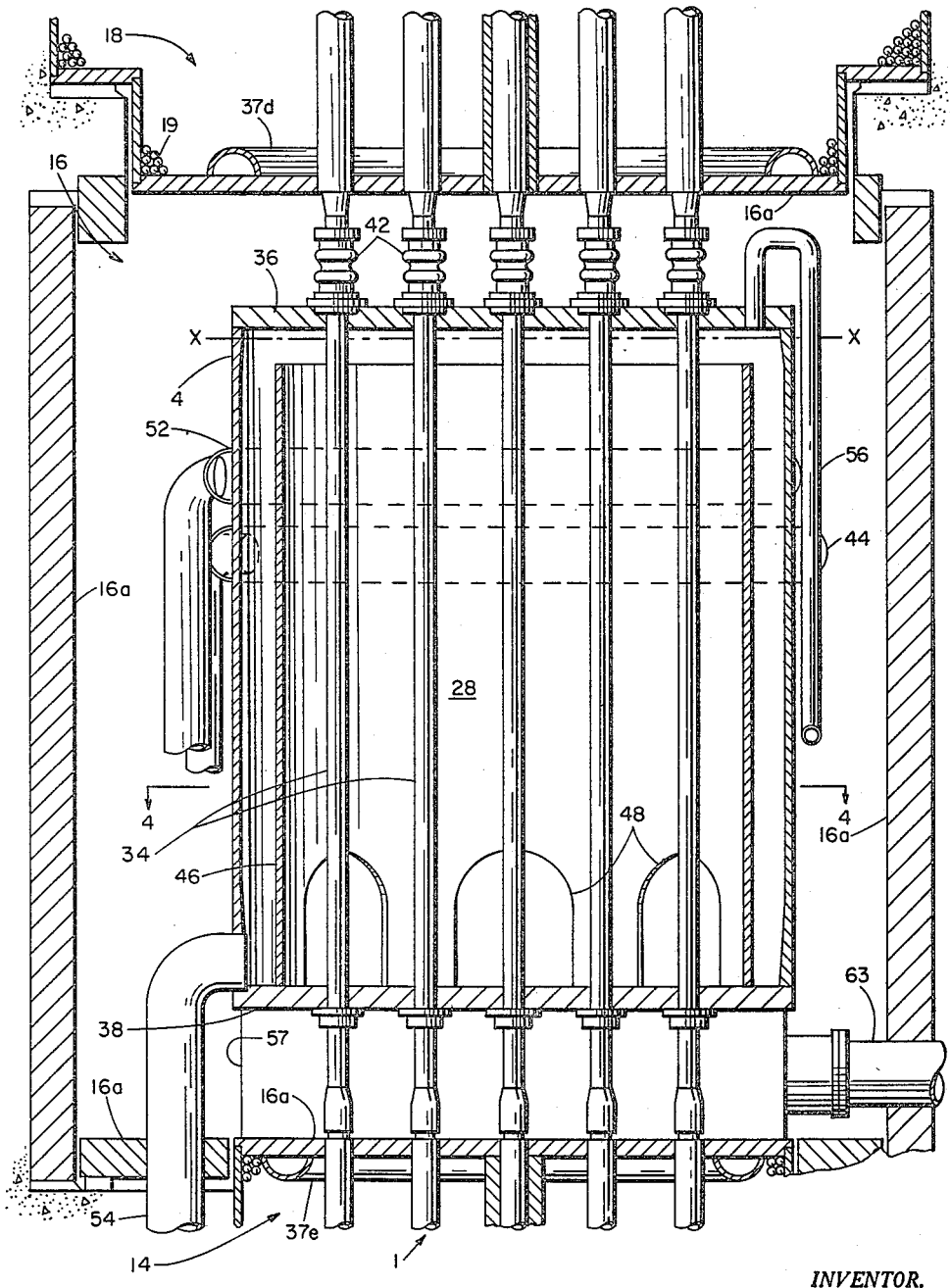

Other objects and benefits of this invention will hereinafter become more readily apparent from a description of the drawings in which:

FIGURE 1 is a schematic illustration of a power plant utilizing a sodium deuterium reactor embodying the principles of this invention;

FIGURES 2A, 2B, and 2C illustrate elevation sectional views of portions of the sodium deuterium reactor illustrated schematically in FIGURE 1 and taken along 2—2 of the calandria in FIGURE 4;

FIGURES 3A, 3B, 3C, 3D, 3E, 3F, and 3G illustrate the details of the invention as shown in sectional views of a fuel lattice position; and FIGURE 4 is a view along 4—4 of FIGURE 2B.

The sodium deuterium reactor embodying the principles of this invention uses a calandria to contain the enriched uranium fuel elements, the high temperature sodium coolant, the inert barrier gas, and the relatively low temperature moderator. The fuel elements for the reactor are located in vertically extending fuel-coolant tubes through which the high temperature sodium coolant flows around the fuel elements. The moderator and reflector fluid is contained within the calandria, and calandria tubes surround and are spaced from the fuel coolant tubes. Control of the reactor is effected by poison rods which occupy regular lattice positions replacing fuel carrying rods.

The number of lattice positions provided in the reactor is dictated by fuel loading and control requirements plus a requirement for some spare capacity. In the particular embodiment of the SDR described herein, the reactor fuel load occupies 54 lattice positions out of a total of 73 such positions. Not forming a part of this invention are another 13 lattice positions which are occupied by shim-safety rods; two additional lattice positions which are provided to accommodate regulating control rods; and another four positions which are provided as spares which can be used for either fuel or simply left empty.

Referring to FIGURE 1 for a highly schematized illustration of a power plant employing the SDR in which this invention is embodied, there is shown a sodium deuterium reactor 1 which comprises a lower header room 2, an upper header room 3, a calandria 4 in which barrier tubes 5 pass through calandria tubes 34 which are immersed in $D_2O$ moderator 6, and fuel coolant tubes 7 located within and annularly spaced from each barrier tube 5 and extending between lower header room 2 and upper header room 3. Some suitable inert gas is used to fill the space 6a above moderator 6. Slightly enriched uranium fuel elements are suspended within fuel coolant tubes 7 within calandria 4. Molten sodium passing upwardly through fuel coolant tubes 7 takes the heat of the system and is forced through a primary sodium loop 8 by a pump 8a and rejects the heat in a heat exchanger 9 to molten sodium in a secondary sodium loop 11 wherein the sodium is forced by a pump 11a through suitable steam generation apparatus 12.

Lower and upper header rooms 2 and 3 are supplied with gas by a nitrogen loop 13 containing a pump 13a which can pump the nitrogen through the annular space between tubes 5 and 7 as indicated by arrows B upwardly through reactor 1 to permit the removal of heat from the coolant system. Cooler 13b completes this inert gas circulating system by extracting the heat therefrom.

For an elevation view in section of sodium deuterium reactor 1 in which this invention is embodied, reference is made to FIGURES 2A, 2B, and 2C wherein it is seen that reactor 1 extends below operating floor 10 and comprises the lower header room 2, a lower neutron shield 14 containing steel shot 15, a reactor room 16, an upper neutron shield 18 filled with steel shot 19, and the upper header room 3, the latter of which is topped by a gamma shield plug 22 and a gamma shield ring 24. Plug 22 and ring 24 are filled with steel shot 23 and 25, respectively. Upper and lower header rooms 3 and 2 are formed by insulated shielding walls 3a and 2a, respectively.

Reactor room 16, which is lined with thermal shielding 16a, contains the reactor core 28 of SDR1 comprising the calandria 4 of suitable material such as aluminum in which the calandria tubes 34 are immersed into the $D_2O$ moderator and reflector fluid which fills calandria 4 to a level indicated as $x$—$x$. Calandria tubes 34 occupy a triangular array at positions 34′ shown schematically in FIGURE 4 and extend from and through upper tube sheet 36 of calandria 32 to and through lower tube sheet 38 thereof.

The primary purpose of calandria 4 is to contain the moderator and reflector fluid and provide for its circulation throughout the core area. In the particular arrangement illustrated, calandria 4 is approximately 10 feet in diameter by 12 feet in height with 73 vertical calandria tubes 34 extending between the upper and lower tube sheets 36 and 38 as just described. Due to the differential expansion which takes place between the various calandria tubes and the calandria shell 4, expansion bellows 42 are provided at the junction of each calandria tube 34 and the upper tube sheet 36. At the bottom of calandria 4, tubes 34 are rolled into tube sheet 38 without welding, thereby facilitating individual replacement as is understood in the art. Suitable material for tubes 34 and sheets 36 and 38 is aluminum alloy 5052–0, while the calandria tube bellows 42 and fittings may be made of stainless steel type 304. Within calandria tubes 34 pass the concentric barrier and fuel coolant tubes 5 and 7 containing the fuel elements and control rods, as will later be more particularly described.

The moderator and reflector fluid 6 in calandria 4 is brought into the latter near the top of the vessel at four points 90° apart by means of an inlet header 44. A cylindrical flow baffle 46 mounted concentrically within calandria 4 and resting on lower tube sheet 38 and provided with a plurality of weir-shaped openings 48 adjacent lower tube sheet 38 acts to guide the flow of fluid downward in the space surrounding baffle 46 and then upward through the central portion of core 28 out near the top adjacent and through an outlet header 52. Lines from headers 44 and 52 pass out of reactor room 16 at convenient points and by convenient means as would be obvious in the art. A relatively large, fast drain line 54 extending down from the bottom of calandria 4 provides a means of emptying the moderator and reflector fluid 6 in a very short time in case of an emergency shutdown. As a cover gas over the reactor fluid surface in calandria 4, an inert gas such as helium is provided through an inlet pipe 56 passing through top tube sheet 36. As best indicated in FIGURE 2B, the normal $D_2O$ level is maintained at level $x$—$x$ which is slightly below upper tube sheet 36. Calandria 4 is supported conveniently on some structural member 57. The moderator and reflector fluid provides cooling within calandria 4, and upper tube sheet 36 may be cooled by passages (not shown) in which organic coolant is circulated. Similar passages may also be provided in lower tube sheet 38 and other portions of reactor 1. Appropriate inlet and outlet headers 37a, 37b, 37c, 37d, 37e, and 37f may be provided for this purpose.

Referring more particularly to FIGURE 2C, an inlet 61 is provided to pass nitrogen into lower header room 2. The nitrogen enters tube 5 as shown in FIGURE 1 and exits through an outlet 62 in upper header room 3, shown in FIGURE 2A. Reactor room 16 is provided with a nitrogen outlet 63 and an inlet (not shown) to maintain an inert atmosphere around calandria 4. It will be noted that all connections to calandria 4 lead down into lower header room 2 so that they can be made outside of the reactor room 16, and calandria 4 can be removed or replaced remotely if this should be necessary without entering reactor room 16.

Referring back to FIGURE 2A, fuel coolant tubes 7 extend up to operating floor 10 through gamma shield plug 22, to permit the fuel elements and other assemblies to be lowered thereinto. To remove the egressing primary sodium coolant, pigtails 64 are seen to be connected at 64′ between tubes 7 and subheaders 64a which discharge in turn to headers 64b whereby the sodium is discharged into primary loop 8 as shown in FIGURE 1. The usual piping refinements such as sodium holdup tank 64c may be utilized as is understood in the art.

Referring to FIGURE 2C, fuel coolant tubes 7 terminate within lower header room 2 in pigtails 65 which connect tubes 7 with subheaders 65a and headers 65b to carry the entering primary sodium into fuel coolant tubes 7. The configuration of the pigtails 64 and 65 and their associated sub-headers as illustrated will be seen to accommodate readily the differential expansion of the tubes 7. Structural members 66 support headers 65b and associated plumbing and elements, and a centrally located drain 67 is provided to carry leaking sodium into a dump tank below (not shown).

As previously noted, calandria 4 is provided with 73 lattice positions for calandria tubes 34. Of the 73 lattice positions, 54 of them are provided with fuel mounted within fuel coolant tubes 7 which extend vertically through calandria tubes 34 from lower header room 2 to operating floor 10 as previously noted. A typical fueled lattice position extending from operating floor 10 through gamma shield plug 22, upper header room 3, upper neutron shield 18, reactor room 16, lower neutron shield 14, and terminating in lower header room 2 is shown in FIGURES 3A, 3B, 3C, 3D, 3E, 3F, and 3G. Referring to these figures, it will be seen that a fuel coolant tube 7 extends the whole length of each lattice position. Fuel coolant tube 7 is a cylindrical tube of varying thickness and diameter throughout its whole length, being thickened when passing through gamma shield plug 22, reduced in diameter as it passes just below calandia 4, a further sharp reduction in diameter occurring at 7a within lower neutron shield 14 and terminating in a curved portion, or pigtail 65, which is connected to a source of molten sodium as previously described. The exit for the molten sodium occurs at opening 64′ in upper header room 3 where, as shown in FIGURES 1 and 2A, the sodium is passed into loop 8. The sodium flows through fuel coolant tubes 7 upwardly in the direction indicated by the arrows A.

The purpose of fuel coolant tube 7 is to contain the sodium at the design temperatures, pressures and velocities support the weight and thermal loads imposed by its contained fuel assembly 70, shield plugs, connecting piping in sodium coolant, but at the same time the wall thickness of tube 7 in the region of calandria 4 is minimized as illustrated to reduce parasitic neutron absorption; and, except for a localized section, fuel-coolant tube 7 is maintained in a low stressed condition. The changes in diameter and wall thickness along the length of tube 7 are designed to prevent fast neutrons from streaming through the gaps around tube 7.

As best seen in FIGURE 3B, fuel-coolant tube 7 is supported by a fuel-coolant tube sleeve 68 having a support flange 68a welded at 68b to the heavy wall section of tube 7 in upper header room 3. Flange 68a is provided with openings 68c to permit the flow of nitrogen therethrough in the direction of arrows B into upper header room 3. Flange 68a transmits the weight of tube 7 and fuel element assembly 70 through a barrier tube support flange 69 to a neutron shield liner extension tube 71 which is supported and positioned on top wall 18a of neutron shield 18 but extends to the top wall 16a of reactor room 16. A seal retainer screw 72 is threaded into the top of tube 71 to clamp flange 68a and prevent rotation of fuel coolant tube 7 by the pigtail reactions and to withstand the vertical forces imposed during fuel handling operations. A neutron shield sleeve 73 lines extension tube 71 from the bottom of the latter to a point adjacent to the bottom of upper neutron shield 18.

Barrier tube 5 surrounds and is spaced from fuel-coolant tube 7 and extends down from upper header room 3 in FIGURE 3B to a point just above pigtails 65 at the top of lower header room 2 in FIGURE 3G. The purpose of barrier tube 5 is to provide an independent separation between the sodium which flows within fuel coolant tubes 7 and the D$_2$O which surrounds calandria tubes 34. Thus barrier tube 5 will act as a flow deflector in the event of either separate or simultaneous leaks of D$_2$O or sodium. In addition, barrier tube 5 provides for nitrogen flow as indicated by arrows B in a separate gas annulus between tube 5 and fuel coolant tube 7. Barrier tube 5 is likewise in a low stressed condition and has a variety of diameter changes as illustrated.

Barrier tube 5 is supported at its top by support flange 69 previously described and extends down into lower header room 2 where it terminates above a sodium leak cup 74 which is welded to pigtail 65 of coolant tube 7. The top end of barrier tube 5 is welded to support flange 69, and the latter is sealed in a convenient fashion. At its lower end, barrier tube 5 is sealed by bellows 84 and appropriate threaded members 85 and 86 which are attached to bellows 84. Thus barrier tube 5 being rigidly supported only at its top can expand freely down through the reactor as a result of increases in temperature. This sealing is provided to prevent communication between the nitrogen in calandria room 16 surrounding tube 5 and the nitrogen in the upper and lower header rooms 3 and 2, respectively, flowing through tube 5.

Below lower tube sheet 38 of calandria 4, as shown in FIGURE 3F, a circumferential splash tube 88 is welded to barrier tube 5. Splash tube 88 overhangs an extension 92 of a neutron shield liner 93 which terminates in bottom 14a of lower neutron shield 14. Spacer pins 94 are welded along the length of barrier tube 5 and are used to maintain the gaps between the various tubes as illustrated. Each set of spacers 94 consists of four pins spaced 90° apart.

Within calandria 4 between upper tube sheet 36 and lower tube sheet 38, as best shown in FIGURES 3D and 3E, fuel-coolant tube 7 is surrounded by a pair of cylindrical, concentrically arranged tubes consisting of the barrier tube 5 and calandria tube 34, both previously identified. Each calandria tube 34 at its lower end passes through calandria lower tube sheet 38 and terminates in a housing 96 for probes 98 to detect the leakage of D$_2$O through calandria tube 34 into the annular space surrounding barrier tube 5. The bottom of tube 34 forms a slot 102 to permit the flow of leaking D$_2$O therethrough into probe housing 96. The upper end of calandria tube 34 terminates in a calandria tube seal assembly 104 comprising a threaded flange 106, a threaded seat 107, and bellows 42 to seal and support the end of calandria tube 34 to upper tube sheet 36. An annular space 109 between barrier tube 5 and calandria tube 34 permits the flow of nitrogen in the direction of arrows C to permit cooling of the calandria tubes 34 under certain conditions.

In the lattice positions containing fuel elements, fuel assembly 70 would be suspended within fuel coolant tube 7 as illustrated. As best shown in FIGURE 3A, a seat 170 in and adjacent the upper end of tube 7 is provided for this purpose. A gamma shield liner 112 surrounds an outer eccentric 114 and an inner eccentric 116, extends through gamma shield plug 22 and is attached to plate 118 forming the bottom of gamma shield plug 22. The purpose of eccentrics 114 and 116 is to accommodate misalignment between fuel coolant tube 7 and shield liner 112. Liner 112 extends up to the reactor floor 10. Seal compression plate 122 and seal retainer screw 123 are threaded into the opening of liner 112 to seal it. Fuel coolant tube 7 is sealed at the top thereof by a fuel closure welded seal 124 as illustrated. Further sealing of tube 7 is described below.

A fuel assembly 70, shown in place within a fuel coolant tube 7 in FIGURES 3A to 3F, consists of a closure plug 150, a cylindrical gamma shield plug 152, a hanger rod 154, a neutron shield spiral plug 156, a fuel element disconnect 158, a fuel element top end fitting 160, a cluster of 19 fuel rods 162, and a fuel element bottom end fitting 164, strung together in the manner illustrated. Closure plug 150 is provided with a knob 166 with which assembly 70 may be lowered and lifted, and a bearing plate 168 which is clamped seal tight on shoulder 170 of tube 7. Plug 150, which is designed to seal the top of coolant tube 7 and unseal it when the plug is lowered or lifted, is not a part of this invention. Plug 156 is provided with spiral passageways 172 to permit the flow of sodium coolant therethrough. Disconnect 158 is some convenient device known in the art for permitting the disconnection of fuel elements 162 from the rest of the assembly 70 when the latter is removed from reactor 1. End fittings 160 and 164 assist in supporting and clamping the ends of fuel elements 162 which consist, in this case, of stainless steel tubes containing pellets of 3% enriched fuel manufactured from powdered UO$_2$ which is compressed and sintered into convenient sized pellets as is understood in the art. The steel tubes are sealed by welded plugs in both ends and air is pumped therefrom by evacuating and flushing with helium. The fuel element data is shown in Table I:

*Table I*

| | |
|---|---|
| Fuel | 3% enriched UO$_2$. |
| Fuel type | Pellets. |
| Pellet dimensions: | |
|   Diameter, in. | 0.3600±0.0005. |
|   Length, in. | 0.720±0.002, tentative (final height to be determined by fabricator). |
| Number of fuel rods per element | 19. |
| Length of one fuel rod, including end plugs | 11 ft. 5 in. |
| Active length of one fuel rod | 9 ft. 5 in. |
| Volume of UO$_2$ per fuel rod (cold), in.$^3$ | 11.501. |
| Density of UO$_2$ fuel, lb./in.$^3$ | 0.375. |
| Weight of UO$_2$ per fuel rod, lb | 4.31. |
| Weight of UO$_2$ per 19-rod element, lb. | 81.9. |
| Weight of UO$_2$ in reactor, lb | 4,425. |
| Number of fuel elements | 54. |
| SS tube cladding I.D., in | 0.362 (+0.001−0.000). |
| SS tube cladding thickness, in | 0.015±0.001. |
| Volume of SS cladding in one fuel rod, in.$^3$ | 2.4. |
| Weight of SS cladding in one fuel rod, lb. | 0.697. |
| Thermal bond material | Helium. |
| Fission gas expansion volume, percent of active length | 20. |
| Heat transfer surface area per rod, ft.$^2$ | 0.968. |
| Heat transfer surface area per fuel element, ft.$^2$ | 18.4. |
| Coolant flow area normal to direction of flow, ft.$^2$ | 0.0271. |
| Pitch spacing, in. | 0.540. |
| Diameter of spacer wire, in | 0.072. |
| Outside diameter of fuel rod, in | 0.392. |
| Overall length of fuel element assembly (not including hanger) | 12 ft. 1 9/16 in. |
| Weight of fuel element assembly | 99 lbs. |

Below each fuel assembly 70 in each fuel coolant tube 7 is provided a neutron shield spiral plug 176 with spiral grooves 178 and with a hanger rod 180 extending upward therefrom and terminating in a grapple knob 112 for lifting shield plug 176 out of tube 7. Orifice plates 184 permit control of coolant flow.

Upper neutron shield 13 and the lower neutron shield 14 are filled with steel shot to prevent the passage of any neutrons from the reaction zone in calandria 4. Reactor 1 is mounted in this particular case below the operating floor 10 and therefore may be surrounded by concrete 128 and other means to limit the danger of radioactivity.

The parameters of one reactor designed according to the principles described above appear in Table II:

*Table II*

Core:
- Number of lattice positions — 73.
- Number of fuel elements — 54.
- Number of spare positions (fuel or control) — 4.
- Number of control rods—
  - Shim-safety — 13.
  - Regulating — 1.
  - Regulating (installed spare) — 1.
- Pitch spacing and type — 10 in., triangular.
- Active core diameter — 7 ft. 6 in.
- Active core height — 9 ft. 5 in.
- Fuel loading—
  - $UO_2$ in core, metric tons — 2.01.
  - U in core, metric tons — 1.77.
  - U-235, kg. — 53.
  - Enrichment, initial, percent — 3.
  - Enrichment, final, percent — 2.
- Burnup, average M.W.-d/metric ton U — 7500.
- Core life — 12 months net full load operation (80% load factor).
- $k_{eff}$, cold, clean — 1.19.
- $k_{eff}$, hot, poisoned — 1.15.
- Rod worth, k — 0.26.
- Reflector $D_2O$ volume, ft.$^3$ — 367.4.
- Moderator $D_2O$ volume in core, ft.$^3$ — 349.6.
- Sodium volume in active core, ft.$^3$ — 14.7.
- Moderator volume/fuel volume in fuel cell — 38.0.
- Radial power distribution, max./avg. — 1.51.
- Axial power distribution, max./avg. — 1.41.

Fuel elements:
- Number — 54.
- Type — 19-rod cluster.
- Fuel material — $UO_2$ pellets.
- Enrichment, percent — 3.
- Fuel pellet O.D., in. — 0.360.
- Density, g./cc. — 10.4.
- Bond — Helium.
- Nominal bond thickness, in. — 0.001.
- Cladding — 304 SS.
- Cladding thickness, in. — 0.015.
- Overall rod diameter, in. — 0.392.
- Pitch spacing, in. — 0.538.
- Spacer method — Helically wound wire.
- Active length — 9 ft. 5 in.
- Overall length (including end fittings) — 12 ft. 1 9/16 in.
- Average heat flux at rod surface, B.t.u./hr.-ft.$^2$ — 138,000.
- Peak heat flux at rod surface, B.t.u./hr.-ft.$^2$ — 320,710.
- Peak cladding temperature, °F. — 1050.
- Peak central temperature, °F. — 4160.
- Average core heat transfer coefficient, B.t.u./hr.-ft.$^2$-°F. — 8600.
- Heat transfer surface area, ft.$^2$/element — 18.4.
- Fission gas expansion volume, percent of total — 20.
- Fission gas pressure at max. burnup, p.s.i.a. — 140.

Control rods:
- Number (shim-safety) — 13.
- Number (regulating) — 1, plus 1 installed spare.
- Total reactivity worth (shim-safety), k — 0.26.
- Reactivity worth (regulating), k — 0.005.
- Poison material — Cadmium (aluminum clad).
- Coolant — Nitrogen gas.
- Location — Top drive — enclosed in upper gamma shield.
- Lifetime — Two years (at full power).
- Active length — 10 ft. 5 5/8 in.
- Shape — Hollow cylinder — 3.585 in. O.D. 3.461 in. I.D.
- Scram time — Less than 1 sec. for 90% of fall.
- Stroke, ft. — 10.
- Average reactivity speed for all rods in motion, k/sec. — $1.6 \times 10^{-4}$.

Barrier:
- Gap thickness (within core) between barrier and fuel coolant tube, in. — 0.250.
- Barrier material — 5050 aluminum.
- Barrier (within core) O.D., in. — 3.505.
- Barrier thickness, in. — 0.065.
- Gap thickness between barrier and calandria tube, in. — 0.185.
- Overall length — 27 ft. 1 1/4 in.
- Maximum design temperature, °F. — 800.
- Design stress, p.s.i. — 1000.

Moderator:
- Material — $D_2O$.
- Pressure — Slightly pressurized.
- Average temperature, °F. — 135.

Reflector:
- Material — $D_2O$ (integral with moderator).
- Axial reflector thickness, in.—
  - Top — 12.
  - Bottom — 12.
- Radial reflector thickness, in. — 12.

Fuel coolant tubes:
- Material — 316 SS.
- O.D. (within core), in. — 2.875.
- Thickness (within core), in. — 0.035.
- I.D. (within core), in. — 2.805.
- Overall length — 42 ft. 9 in.
- Design stress, p.s.i. — 9100.
- Maximum design temperature, °F. — 1050.
- Operating internal pressure, p.s.i.g. (max.) — 87.8.
- Total number of fuel coolant tubes — 58.
- Coolant flow area per fueled tube, ft.$^2$ — 0.027.

Calandria:
- Tube material — 5052-0 aluminum.
- Tube O.D., in. — 4.125.
- Tube thickness, in. — 0.125.
- Tube I.D., in. — 3.875.
- Number of tubes — 73.
- Shell material — 5052-0 aluminum.
- Shell I.D. — 9 ft. 5 1/4 in.
- Shell thickness, in. — 0.75.
- Height inside — 11 ft. 8 in.
- Moderator depth — 11 ft. 5 in.
- Lower and upper tube sheet material — 5052-0 aluminum.
- Lower and upper tube sheet thickness, in. — 3.

Thermal shield:
- Material — Cast iron.
- Thickness, in. — 6.5.
- Cooling medium — Organic.
- Heat generated, B.t.u./hr. — $6.9 \times 10^{-6}$.

$D_2O$ system:
- $D_2O$ inlet temperature, °F. — 110.
- $D_2O$ outlet temperature, °F. — 137.
- $D_2O$ flow rate, g.p.m. — 1300.
- $D_2O$ system cover gas — Helium.
- System pressure—
  - Maximum cover gas pressure in calandria — 3 in. $H_2O$.
  - Maximum pump P. p.s.i. — 36.
- $D_2O$ inventory (2000 lb./ton = 67.88 lb./ft.$^3$)—
  - Weight of moderator $D_2O$, tons — 11.86.
  - Weight of reflector $D_2O$, tons — 12.47.
  - Total weight of $D_2O$ in calandria, tons — 24.33.
  - Weight of $D_2O$ in external system, tons — 5.19.
  - Total $D_2O$ inventory, tons — 29.52.

Thermal cycle for maximum plant capacity:
- Total thermal power, M.W. — 43.
- Heat to primary coolant, M.W. — 40.
- Gross electrical output, M.W. — 13.4.
- Net electrical output, M.W. — 12.6.
- Net plant thermal efficiency, percent — 29.3.

It should be understood that the foregoing disclosure relates to only a preferred embodiment of the invention and that numerous modifications or alterations may be made therein without departing from the spirit and the scope of the invention as set forth in the appended claims.

We claim:

1. In a sodium, deuterium oxide reactor consisting of a reactor room, a sealed calandria spaced within said reactor room containing said deuterium oxide, an upper header room disposed above said reactor room, a lower header room disposed below said reactor room, a leakage separation and thermal barrier system for separating said sodium and deuterium oxide, comprising: a plurality of thin metal walled fuel coolant tubes extending into and through said calandria passing through said upper header room to and terminating within said lower header room for conveying said sodium in a molten condition, means suspending said fuel-coolant tubes from the tops thereof to permit their downward thermal expansion, fissionable fuel elements mounted within and supported by said coolant tubes in the portion thereof enclosed by said calandria, a barrier tube for each said fuel-coolant tube surrounding and spaced therefrom extending from within said upper header room to within said lower header room, means for sealing the ends of each said barrier tube to the bottom and top walls of said upper and lower header rooms, respectively, thereby forming an annular passageway between each said fuel coolant and barrier tube interconnecting both said header rooms, and a calandria tube surrounding and spaced from each said barrier tube extending through said calandria and sealed at the ends thereof to the walls of said calandria forming an annular space open to said reactor room and resiliently supported at the tops thereof to permit their thermal expansion upwardly, said annular passageway and said annular space forming separate barriers to prevent contact of leaking sodium with leaking deuterium oxide and reduce the transfer of heat from the molten sodium to the deuterium oxide.

2. In a sodium, deuterium oxide reactor consisting of a reactor room, a sealed calandria spaced within said reactor room containing said deuterium oxide filled to a predetermined level, an upper header room disposed above said reactor room, and a lower header room disposed below said reactor room, a leakage separation and barrier system for separating said sodium and deuterium oxide, comprising: a plurality of thin metal walled fuel-coolant tubes extending into and through said calandria, passing through said upper header room to and terminating within said lower header room for conveying said sodium in a molten condition, fissionable fuel elements mounted within and supported by said coolant tubes in the portion thereof enclosed by said calandria, a barrier tube for each said fuel-coolant tube surrounding and spaced therefrom extending from within said upper header room to within said lower header room, means for sealing the ends of each of said barrier tube to the bottom and top walls of said upper and lower header rooms, respectively, thereby forming an annular passageway between each said fuel-coolant and barrier tube interconnecting both said header rooms, a calandria tube surrounding and spaced from each said barrier tube extending through said calandria and sealed at the ends thereof to the walls of said calandria forming an annular space open to said reactor room, said annular passageway and said annular space forming separate barriers to prevent contact of leaking sodium with leaking deuterium oxide and reduce the transfer of heat from the molten sodium to the deuterium oxide, means maintaining an inert gas within said calandria above said deuterium oxide level at substantially atmospheric pressure, means for circulating an inert gas between said header rooms through said annular passageway, and means for filling said reactor room including said annular space with an inert gas and maintaining said inert gas substantially at atmospheric pressure to minimize pressure loadings on said fuel-coolant and barrier tubes.

References Cited in the file of this patent
UNITED STATES PATENTS

| | | |
|---|---|---|
| 2,658,728 | Evans | Nov. 10, 1953 |
| 2,832,733 | Szilard | Apr. 29, 1958 |
| 2,915,446 | Liljeblad | Dec. 1, 1959 |
| 2,977,297 | Evans et al. | Mar. 28, 1961 |

FOREIGN PATENTS

| | | |
|---|---|---|
| 754,183 | Great Britain | Aug. 1, 1956 |

OTHER REFERENCES

Nuclear Engineering Handbook, McGraw-Hill, 1958, pp. 13–32.

Glasstone: Principles of Nuclear Reactor Engineering, Van Nostrand (1955), pp. 804–805.

Parkins: vol. 3, International Conference on the Peaceful Uses of Atomic Energy, pp. 295–306.

Chemical and Engineering Progress 53 (No. 4), April 1957, page 19. (Copy in Scientific Library.)